(12) United States Patent
Shishido et al.

(10) Patent No.: US 6,804,188 B1
(45) Date of Patent: Oct. 12, 2004

(54) DATA RECORDING MEDIUM, DATA RECORDING APPARATUS AND METHOD, AND DATA REPRODUCING APPARATUS AND METHOD

(75) Inventors: Yukio Shishido, Kanagawa (JP); Tetsuji Kawahima, Kanagawa (JP); Yoichiro Sako, Tokyo (JP); Tatsuya Inokuchi, Kanagawa (JP); Katsumi Toyama, Kanagawa (JP); Shigeki Tsukatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 745 days.

(21) Appl. No.: 09/675,960

(22) Filed: Sep. 29, 2000

(30) Foreign Application Priority Data

Sep. 29, 1999 (JP) .......................................... P11-277425

(51) Int. Cl.[7] ................................................. G11B 7/00
(52) U.S. Cl. ................................ 369/275.3; 369/59.25; 369/124.07
(58) Field of Search .......................... 369/30.01, 30.03, 369/47.21, 47.22, 53.2, 53.24, 53.34, 53.41, 53.44, 59.25, 59.26, 124.07, 275.3

(56) References Cited

U.S. PATENT DOCUMENTS 5,737,287 A  4/1998  Lee .......................... 369/44.26
5,825,731 A  * 10/1998  Yokota .................... 369/47.12

FOREIGN PATENT DOCUMENTS

| EP | 94117021 | 10/1994 |
|---|---|---|
| EP | 1089271 | 4/2001 |
| EP | 0939389 | 11/2001 |
| JP | 62082586 | 4/1987 |
| JP | 7262754 | 10/1995 |
| JP | 11120707 | 4/1999 |

* cited by examiner

Primary Examiner—Paul W. Huber
(74) Attorney, Agent, or Firm—Jay H. Maioli

(57) ABSTRACT

An absolute time area is expanded by using an area of relatively low importance such as zero-data area and/or relative time area or the like in a Q channel in a sub-code in a recording format of a CD. Thus, an absolute time expression which can cope with a disc having a large capacity or the like can be performed. An absolute time expression is performed in a manner such that a digit of "100 minutes" is BCD expressed by using lower 4 bits in the 8-bit zero-data area ZERO. Thus, the absolute time of up to 999min59sec74frame can be expressed. A digit of "hour" is also expressed by using the lower 4 bits in the zero-data area. For example, identification information showing that a disc is a high density optical disc of large capacity is expressed by using the upper 4 bits in the zero-data area ZERO.

13 Claims, 15 Drawing Sheets

|  | P | Q | R | S | T | U | V | W |
|---|---|---|---|---|---|---|---|---|
| FRAME F01 | | | | S0 | | | | |
| F02 | | | | S1 | | | | |
| F03 | P01 | Q01 | R01 | S01 | T01 | U01 | V01 | W01 |
| F04 | P02 | Q02 | R02 | S02 | T02 | U02 | V02 | W02 |
| . | . | . | . | . | . | . | . | . |
| . | . | . | . | . | . | . | . | . |
| . | . | . | . | . | . | . | . | . |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

S0=00100000000001
S1=00000000010010

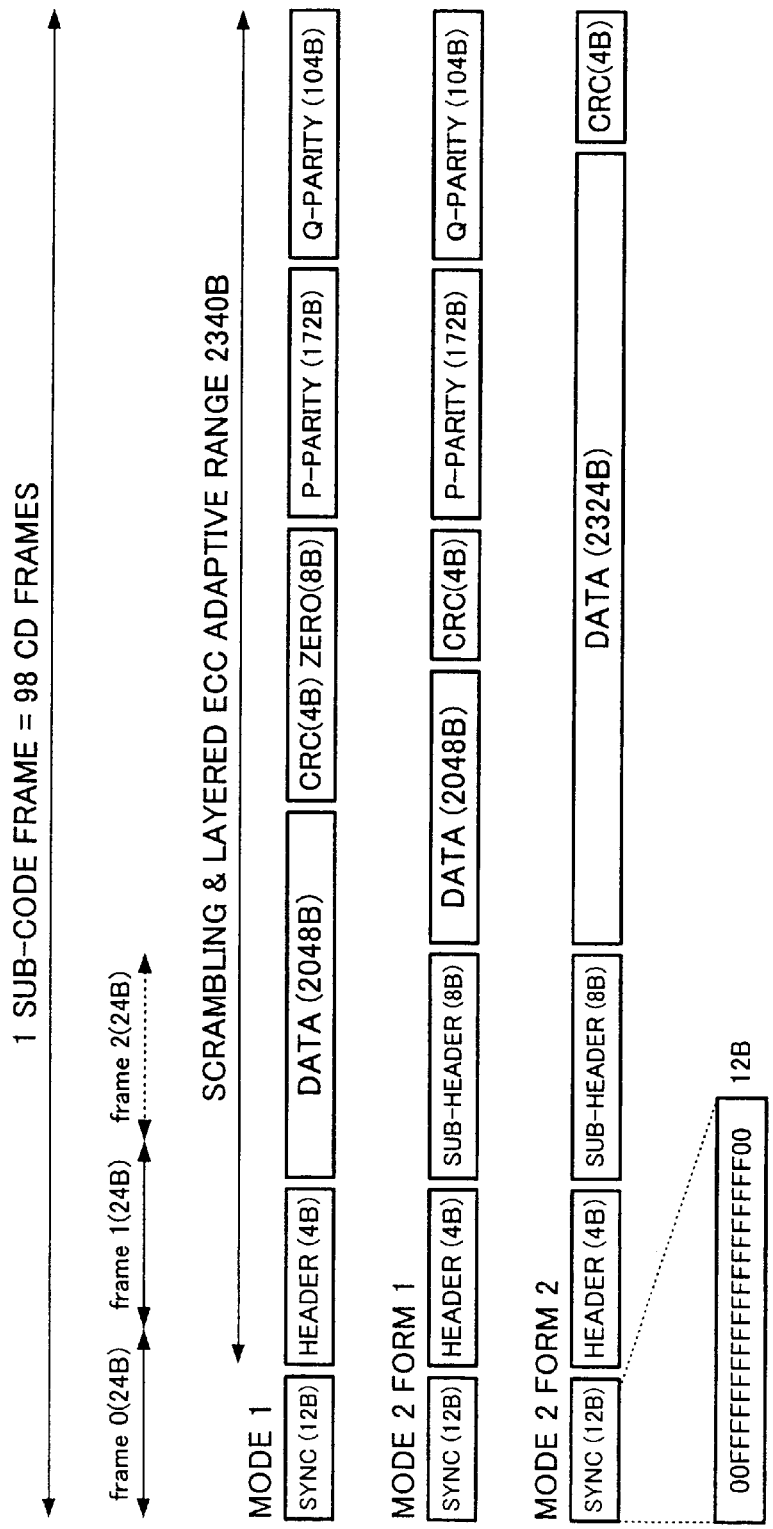

Fig. 7

| ZERO | AMIN | ASEC | AFRAME | |
|---|---|---|---|---|
| xxxx0000 | 00000000 | 00000000 | 00000000 | 000MIN00SEC00FRAME |
| .. | .. | .. | .. | .. |
| xxxx0000 | 10011001 | 01011001 | 01110100 | 099MIN59SEC74FRAME |
| xxxx0001 | 00000000 | 00000000 | 00000000 | 100MIN00SEC00FRAME |
| xxxx0001 | 00000000 | 00000000 | 00000001 | 100MIN00SEC01FRAME |
| xxxx0001 | 00000000 | 00000000 | 00000010 | 100MIN00SEC02FRAME |
| .. | .. | .. | .. | .. |
| xxxx0001 | 10011001 | 01011001 | 01110100 | 199MIN59SEC74FRAME |
| xxxx0010 | 00000000 | 00000000 | 00000000 | 200MIN00SEC00FRAME |
| xxxx0010 | 00000000 | 00000000 | 00000001 | 200MIN00SEC01FRAME |
| xxxx0010 | 00000000 | 00000000 | 00000010 | 200MIN00SEC02FRAME |
| .. | .. | .. | .. | .. |
| xxxx0010 | 10011001 | 01011001 | 01110100 | 299MIN59SEC74FRAME |
| xxxx0011 | 00000000 | 00000000 | 00000000 | 300MIN00SEC00FRAME |
| xxxx0011 | 00000000 | 00000000 | 00000001 | 300MIN00SEC01FRAME |
| xxxx0011 | 00000000 | 00000000 | 00000010 | 300MIN00SEC02FRAME |
| .. | .. | .. | .. | .. |
| xxxx1000 | 10011001 | 01011001 | 01110100 | 899MIN59SEC74FRAME |
| xxxx1001 | 00000000 | 00000000 | 00000000 | 900MIN00SEC00FRAME |
| xxxx1001 | 00000000 | 00000000 | 00000001 | 900MIN00SEC01FRAME |
| xxxx1001 | 00000000 | 00000000 | 00000010 | 900MIN00SEC02FRAME |
| .. | .. | .. | .. | .. |
| xxxx1001 | 10011001 | 01011001 | 01110100 | 999MIN59SEC74FRAME |

Fig. 8

| RELATIVE TIME | AMIN | ASEC | AFRAME | |
|---|---|---|---|---|
| ..xxxxxxxx0000 | 00000000 | 00000000 | 00000000 | 000MIN00SEC00FRAME |
| .. | .. | .. | .. | .. |
| ..xxxxxxxx0000 | 10011001 | 01011001 | 01110100 | 099MIN59SEC74FRAME |
| ..xxxxxxxx0001 | 00000000 | 00000000 | 00000000 | 100MIN00SEC00FRAME |
| ..xxxxxxxx0001 | 00000000 | 00000000 | 00000001 | 100MIN00SEC01FRAME |
| ..xxxxxxxx0001 | 00000000 | 00000000 | 00000010 | 100MIN00SEC02FRAME |
| .. | .. | .. | .. | .. |
| ..xxxxxxxx0001 | 10011001 | 01011001 | 01110100 | 199MIN59SEC74FRAME |
| ..xxxxxxxx0010 | 00000000 | 00000000 | 00000000 | 200MIN00SEC00FRAME |
| ..xxxxxxxx0010 | 00000000 | 00000000 | 00000001 | 200MIN00SEC01FRAME |
| ..xxxxxxxx0010 | 00000000 | 00000000 | 00000010 | 200MIN00SEC02FRAME |
| .. | .. | .. | .. | .. |
| ..xxxxxxxx0001 | 10011001 | 01011001 | 01110100 | 299MIN59SEC74FRAME |
| ..xxxxxxxx0011 | 00000000 | 00000000 | 00000000 | 300MIN00SEC00FRAME |
| ..xxxxxxxx0011 | 00000000 | 00000000 | 00000001 | 300MIN00SEC01FRAME |
| ..xxxxxxxx0011 | 00000000 | 00000000 | 00000010 | 300MIN00SEC02FRAME |
| .. | .. | .. | .. | .. |
| ..xxxxxxxx1000 | 10011001 | 01011001 | 01110100 | 899MIN59SEC74FRAME |
| ..xxxxxxxx1001 | 00000000 | 00000000 | 00000000 | 900MIN00SEC00FRAME |
| ..xxxxxxxx1001 | 00000000 | 00000000 | 00000001 | 900MIN00SEC01FRAME |
| ..xxxxxxxx1001 | 00000000 | 00000000 | 00000010 | 900MIN00SEC02FRAME |
| .. | .. | .. | .. | .. |
| ..xxxxxxxx1001 | 10011001 | 01011001 | 01110100 | 999MIN59SEC74FRAME |

Fig. 9

| ZERO | AMIN | ASEC | AFRAME | |
|---|---|---|---|---|
| xxxx0000 | 00000000 | 00000000 | 00000000 | 0H00MIN00SEC00FRAME |
| .. | .. | .. | .. | .. |
| xxxx0000 | 01011001 | 01011001 | 01110100 | 0H59MIN59SEC74FRAME |
| xxxx0001 | 00000000 | 00000000 | 00000000 | 1H00MIN00SEC00FRAME |
| xxxx0001 | 00000000 | 00000000 | 00000001 | 1H00MIN00SEC01FRAME |
| xxxx0001 | 00000000 | 00000000 | 00000010 | 1H00MIN00SEC02FRAME |
| .. | .. | .. | .. | .. |
| xxxx0001 | 01011001 | 01011001 | 01110100 | 1H59MIN59SEC74FRAME |
| xxxx0010 | 00000000 | 00000000 | 00000000 | 2H00MIN00SEC00FRAME |
| xxxx0010 | 00000000 | 00000000 | 00000001 | 2H00MIN00SEC01FRAME |
| xxxx0010 | 00000000 | 00000000 | 00000010 | 2H00MIN00SEC02FRAME |
| .. | .. | .. | .. | .. |
| xxxx0010 | 01011001 | 01011001 | 01110100 | 2H59MIN59SEC74FRAME |
| xxxx0011 | 00000000 | 00000000 | 00000000 | 3H00MIN00SEC00FRAME |
| xxxx0011 | 00000000 | 00000000 | 00000001 | 3H00MIN00SEC01FRAME |
| xxxx0011 | 00000000 | 00000000 | 00000010 | 3H00MIN00SEC02FRAME |
| .. | .. | .. | .. | .. |
| xxxx1000 | 01011001 | 01011001 | 01110100 | 8H59MIN59SEC74FRAME |
| xxxx1001 | 00000000 | 00000000 | 00000000 | 9H00MIN00SEC00FRAME |
| xxxx1001 | 00000000 | 00000000 | 00000001 | 9H00MIN00SEC01FRAME |
| xxxx1001 | 00000000 | 00000000 | 00000010 | 9H00MIN00SEC02FRAME |
| .. | .. | .. | .. | .. |
| xxxx1001 | 01011001 | 01011001 | 01110100 | 9H59MIN59SEC74FRAME |

Fig. 11

| ZERO | AMIN | ASEC | AFRAME | |
|---|---|---|---|---|
| xxxx0000 | 00000000 | 00000000 | 00000000 | 0H00MIN00SEC00FRAME |
| .. | .. | .. | .. | .. |
| xxxx0000 | 01111001 | 01011001 | 01110100 | 0H79MIN59SEC74FRAME |
| xxxx0001 | 00100000 | 00000000 | 00000000 | 1H20MIN00SEC00FRAME |
| xxxx0001 | 00100000 | 00000000 | 00000001 | 1H20MIN00SEC01FRAME |
| xxxx0001 | 00100000 | 00000000 | 00000010 | 1H20MIN00SEC02FRAME |
| .. | .. | .. | .. | .. |
| xxxx0001 | 01011001 | 01011001 | 01110100 | 1H59MIN59SEC74FRAME |
| xxxx0010 | 00000000 | 00000000 | 00000000 | 2H00MIN00SEC00FRAME |
| xxxx0010 | 00000000 | 00000000 | 00000001 | 2H00MIN00SEC01FRAME |
| xxxx0010 | 00000000 | 00000000 | 00000010 | 2H00MIN00SEC02FRAME |
| .. | .. | .. | .. | .. |
| xxxx0010 | 01011001 | 01011001 | 01110100 | 2H59MIN59SEC74FRAME |
| xxxx0011 | 00000000 | 00000000 | 00000000 | 3H00MIN00SEC00FRAME |
| xxxx0011 | 00000000 | 00000000 | 00000001 | 3H00MIN00SEC01FRAME |
| xxxx0011 | 00000000 | 00000000 | 00000010 | 3H00MIN00SEC02FRAME |
| .. | .. | .. | .. | .. |
| xxxx1000 | 01011001 | 01011001 | 01110100 | 8H59MIN59SEC74FRAME |
| xxxx1001 | 00000000 | 00000000 | 00000000 | 9H00MIN00SEC00FRAME |
| xxxx1001 | 00000000 | 00000000 | 00000001 | 9H00MIN00SEC01FRAME |
| xxxx1001 | 00000000 | 00000000 | 00000010 | 9H00MIN00SEC02FRAME |
| .. | .. | .. | .. | .. |
| xxxx1001 | 01011001 | 01011001 | 01110100 | 9H59MIN59SEC74FRAME |

DATA RECORDING MEDIUM, DATA RECORDING APPARATUS AND METHOD, AND DATA REPRODUCING APPARATUS AND METHOD

BACKGROUND OF THE INVENTION

1. Field of the Invention

The invention relates to a data recording medium, data recording apparatus and method, and data reproducing apparatus and method which can be applied to a plurality of kinds of optical discs having, for example, different recording densities.

2. Description of the Related Art

In recent years, an optical disc as a recording medium of a large capacity has been being developed. For example, there are read only discs such as CD (Compact Disc) on which music information has been recorded, CD-ROM in which data for a computer has been recorded, and the like. In those optical discs, a sub-code having eight channels (P, Q, R, S, T, U, V, W) is prepared together with audio data or the like, and time information of the audio data or digital data has been recorded in data of 72 bits in the Q channel.

The time information includes: an absolute time as a reproduction elapsed time from the head of a recording area on a CD or the like; and a relative time (elapsed time in a movement) as a reproduction elapsed time from the head of each music piece or each index. Those time information is BCD (Binary Coded Decimal) coded by two digits in a format (referred to as an MSF format) in which a minute (MIN), a second (SEC), and a frame number (FRAME) are used as units. In the ordinary CD, one second corresponds to 75 frames and the absolute time within a range from a 00min00sec00frame to a 99min59sec74frame can be expressed (however, according to the standard of the CD, the absolute time is set to be shorter than 80 minutes). In case of the CD-ROM, those time information shows address information of the digital data.

In recent years, optical discs in which data can be written once, data is rewritable, and the like such as WORM-type (Write Once Read Mostly) CD-R (CD-Recordable), rewritable-type CD-RW (CD-Rewritable), and the like have been being put into practical use. In those discs, recording address information called ATIP (Absolute Time In Pregroove) is frequency modulated and expressed by a BCD expression by the MSF format into a guide groove (pregroove) wobbled by a sinewaveform of 22.05 kHz.

A high density optical disc in which a capacity and a density of the optical disc as mentioned above are increased is strongly demanded in the market. In the high density optical disc, inconvenience occurs in the case where the conventional absolute time expression is used as it is. That is, under the absolute time expression of up to 99min59sec74frame, it is impossible to cope with a high density disc having a large capacity.

To solve the above problem, in case of the high density disc, the use of time information which can express addresses of a large capacity is considered. The time information differs from the time information recorded on the existing disc. It is necessary that processes at the time when the time information of different formats exist mixedly as mentioned above are properly executed. For example, although the time information is usually displayed, it is desirable that the time information of the high density disc can be displayed by a method whereby a feeling of difference from that of the display of the time information of the existing disc is small.

To promptly execute processes, it is important to rapidly make a discrimination of the type of disc about whether the disc loaded in a reproducing apparatus is an ordinary disc or a high density optical disc or the like, or the like. That is, unless the type of disc can be discriminated prior to a demodulating process of data recorded on the optical disc, it is unknown how to set internal processes or dedicated hardware of the apparatus which depend on the type of disc. Therefore, the number of trials increases and a necessity of performing a troublesome disc discriminating process occurs. To avoid such a situation, a method of discriminating whether the optical disc is the conventional disc or the high density optical disc or the like without increasing a burden on the reproducing apparatus is strongly demanded.

OBJECTS AND SUMMARY OF THE INVENTION

It is, therefore, an object of the invention to provide a data recording medium, data recording apparatus and method, and data reproducing apparatus and method which are effective when they are applied to a case where different kinds of time information or addresses exist mixedly.

According to the invention of claim 1, there is provided a disc-shaped recording medium in which information is recorded by a recording format based on a CD format, wherein the medium has a sub-code area in which a sub-code as additional information is recorded, the sub-code area has a Q channel for recording address information which shows a recording position of the information which is recorded on the disc-shaped recording medium and includes absolute time information shown by each unit of "hour", "minute", "second", and "frame", and the Q channel is defined on the basis of the CD format and a zero-data area in the Q channel has an AHOUR area in which time information shown by the "hour" unit in the absolute time information is recorded.

According to the invention of claim 14, there is provided a data recording apparatus for recording main data and time information accompanied for the main data into a recording medium, comprising:

identifying means for identifying a type of the recording medium;

data converting means for outputting the time information and switching a format of the time information which is outputted in accordance with the type of the recording medium; and recording means for recording the time information outputted from the data converting means together with the main data into the recording medium.

According to the invention of claim 24, there is provided a data recording method of recording main data and time information accompanied for the main data into a recording medium, comprising the steps of:

identifying a type of the recording medium;

converting time information in a first format in the time information which is expressed by a plurality of different formats into time information in a second format different from the first format in accordance with the type of the recording medium; and recording the converted time information together with the main data into the recording medium.

According to the invention of claim 30, there is provided a data recording method of recording main data and time information accompanied for the main data into a recording medium, comprising the steps of:

identifying a type of the recording medium;

forming selected time information in the time information which is expressed by a plurality of different formats in accordance with the type of the recording medium; and recording the formed time information together with the main data into the recording medium.

According to the invention of claim 36, there is provided a data reproducing apparatus for reproducing a recording medium in which main data and time information accompanied for the main data have been recorded, comprising:

identifying means for identifying a type of the recording medium;

pickup means for reading the time information recorded in the recording medium;

demodulating means for switching a format of the time information outputted from the pickup means in accordance with the type of the recording medium; and reproducing means for reproducing or displaying the time information outputted from the demodulating means.

According to the invention, an expansion of an expression of the time information, a recording of discrimination information regarding the disc type or the like, or the like can be performed by using an area of a relatively low significance among areas in which the additional information has been recorded. In the case where a plurality of kinds of data recording media can be reproduced, the problem such that the displays of the time information exist mixedly can be avoided.

The above and other objects and features of the present invention will become apparent from the following detailed description and the appended claims with reference to the accompanying drawings.

BRIEF DESCRIPTION OF THE DRAWINGS

FIG. 6 is a schematic diagram for explaining a recording format of a CD-ROM;

FIG. 7 is a schematic diagram for explaining an expression of an absolute time in the first embodiment of the invention;

FIG. 8 is a schematic diagram for explaining an expression of an absolute time in the second embodiment of the invention;

FIG. 9 is a schematic diagram for explaining an expression of an absolute time in the third embodiment of the invention;

FIG. 11 is a schematic diagram for explaining an expression of an absolute time in the fourth embodiment of the invention;

DETAILED DESCRIPTION OF THE PREFERRED EMBODIMENTS

Figure 1:
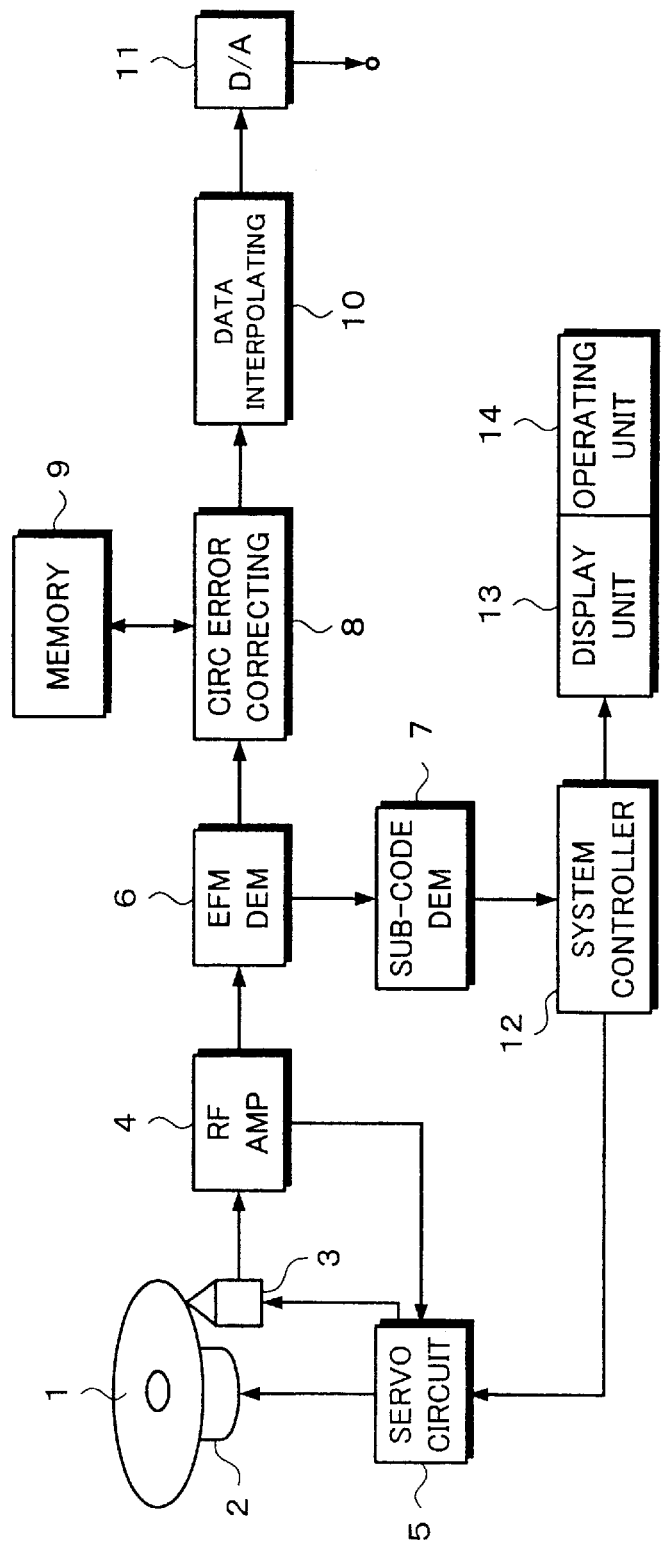
FIG. 1 is a block diagram showing a whole construction of a disc drive to which the invention is applied.

The first embodiment of the invention will now be described hereinbelow. FIG. 1 shows an example of a construction of an optical disc player as a reproducing apparatus in the first embodiment of the invention. Reference numeral 1 denotes an optical disc such as a CD. The optical disc 1 is rotated by a spindle motor 2. An optical pickup 3 irradiates a laser beam to the optical disc 1, receives the reflection light, obtains a read signal on the basis of the received reflection light, and supplies the read signal to an RF (Radio Frequency) amplifier 4. An intensity of the laser beam is optimized by an APC (Automatic Power Control) (not shown). The RF amplifier 4 performs a process such as a gain control or the like to the supplied read signal. An output of the RF amplifier 4 is supplied to a servo circuit 5 and an EFM demodulating circuit 6.

The EFM demodulating circuit 6 performs a demodulating process corresponding to an EFM (Eight to Fourteen) modulation performed to the recording data in the case where the optical disc 1 is a CD. An output of the EFM demodulating circuit 6 is supplied to a sub-code demodulating circuit 7 and a CIRC error correcting circuit 8. The CIRC error correcting circuit 8 decodes a CIRC (Cross Interleave Reed Solomon Code) encoding with respect to an output of the EFM demodulating circuit 6 and forms error corrected decoding data. A process of the CIRC error correcting circuit 8 is executed while transmitting and receiving data to/from a memory 9. An output of the CIRC error correcting circuit 8 is supplied to a data interpolating circuit 10. The data interpolating circuit 10 performs an interpolating process to the output of the CIRC error correcting circuit 8. An output of the data interpolating circuit 10 is supplied to a D/A converting circuit 11. The D/A converting circuit 11 D/A converts the output of the data interpolating circuit 10, thereby converting it into an analog signal for driving a construction (not shown) for generating an audio sound from speakers or the like and outputting it.

The servo circuit 5 forms a tracking error signal, a focusing error signal, a spindle error signal, and the like on the basis of the output of the RF amplifier 4. The tracking error signal and focusing error signal are supplied to the optical pickup 3. The spindle error signal is supplied to the spindle motor 2. On the basis of those signals, the optical pickup 3 and spindle motor 2 operate so as to keep the read signal in a preferable state.

The sub-code demodulating circuit 7 demodulates sub-code information outputted from the EFM demodulating circuit 6 and supplies the demodulated sub-code information to a system controller 12. The system controller 12 executes an operation control for each construction in the apparatus such as a servo circuit 5 or the like and allows a display unit 13 to display a music piece number, a relative time, and the like on the basis of the sub-code information which is supplied from the sub-code demodulating circuit 7. The system controller 12 detects discrimination information or the like regarding the type or the like of the optical disc 1 such that information showing whether the loaded disc is a high density optical disc or not or the like from the sub-code information and controls operating conditions or the like of the apparatus on the basis of the detected discrimination information or the like. An operating unit 14 has a construction for allowing the user to input various instructions regarding a playing method or the like such as start of the reproduction, stop, pause, repeat, random, or the like.

Figure 2:
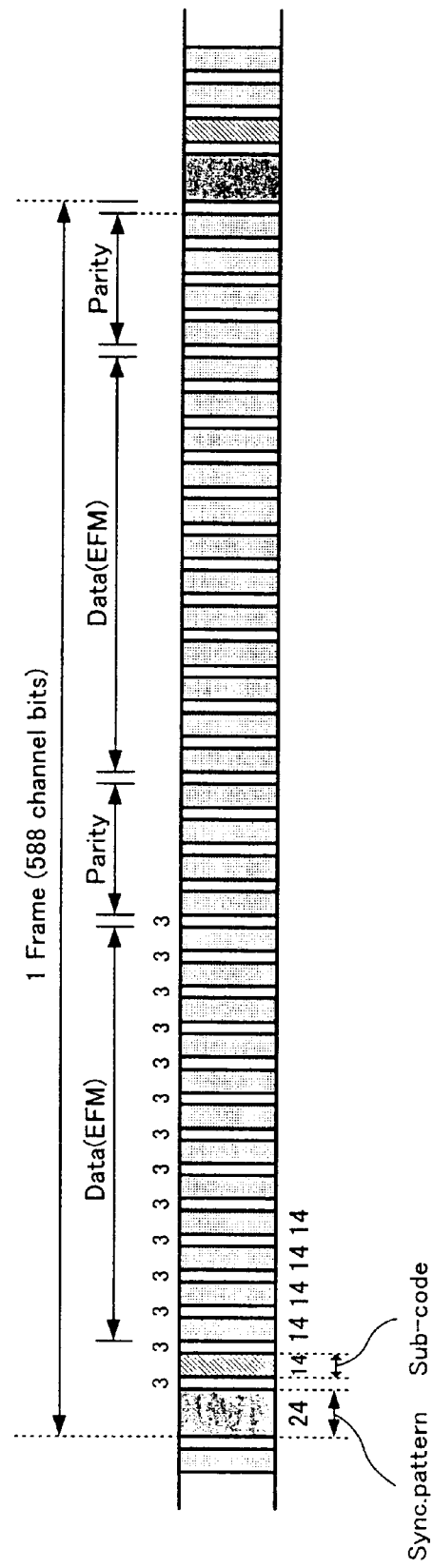
FIG. 2 is a schematic diagram for explaining a frame format in a CD.

A general frame format of the CD will now be described with reference to FIG. 2 in order to easily understand the invention. In one frame, a frame sync signal of 24 channel bits and a sub-code of one symbol, namely, 14 channel bits are recorded and, further, a set of data of 12 symbols, namely, 12×14=168 channel bits and a parity of 4 symbols, namely, 4×14=56 channel bits is repetitively recorded twice. Coupling bits of 3 channel bits are included between the frame sync signal and the sub-code, between the sub-code and the first one symbol of the data of the first set, between the adjacent symbols of the data of the first set, between the last symbol of the data of the first set and the first symbol of the parity of the first set, between the adjacent symbols of the parity of the first set, between the last symbol of the parity of the first set and the first symbol of the data of the second set, between the adjacent symbols of the data of the second set, between the last symbol of the data of the second set and the first symbol of the parity of the second set, between the adjacent symbols of the parity of the second set, and between the last symbol of the parity of the second set and the frame sync signal of the next frame, respectively. The total number of channel bits of the coupling bits is equal to 34×3=102. One frame consists of total 588 channel bits.

Since one frame corresponds to 6 sample intervals, a period of the frame is equal to 44.1/6=7.35 kHz. Since 588 channel bits are included per frame, a reproduction clock is equal to 7.35×588=4.3218 MHZ.

Figures 3, 4:
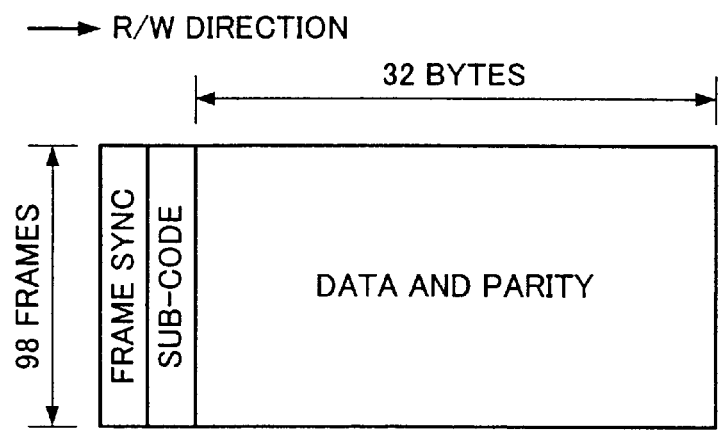
FIG. 3 is a schematic diagram for explaining a format of a sub-code frame in a CD.
FIG. 4 is a schematic diagram for explaining a format of a sub-code in a CD.

As shown in FIG. 3, 98 frames form one set of information (sub-code frame) comprising the frame sync information, sub-code information, and data and parity information. The sub-code data in 98 frames expresses, as one block, the sub-code information. Such a block will now be described with reference to FIG. 4. As sub-codes of the first frame F1 and second frame F2, fixed sync patterns S0=00100000000001 and S1=00000000010010 are recorded, respectively. Patterns which cannot appear in the EFM modulation are used as S0 and S1, so that a start position of the block regarding the sub-code information is specified upon reproduction.

P1, Q1, R1, S1, T1, U1, V1, W1, P2 to W2, P95 to W95, and P96 to W96 have been recorded in the sub-codes of 96 frames of the third frame F3, fourth frame F4, . . . , 97th frame F97, and 98th frame F98, respectively. P1, P2, . . . , P96, Q1, Q2, . . . , Q96, R1 to R96, S1 to S96, T1 to T96, U1 to U96, V1 to V96, and W1 to W96 form completed information channels, respectively.

(1) Information regarding a program function such that the head of a music piece is reproduced, the music pieces are reproduced in a preset order, or the like, (2) additional information such as text information or the like, and the like have been recorded. A P channel and a Q channel of the sub-codes are used as information of (1). R to W channels of the sub-codes are used as information of (2). The P channel indicates a pause between music pieces and is information which is used for a coarse reproduction of the heads of music pieces. The Q channel indicates information for a finer control.

Figures 5A, 5B:
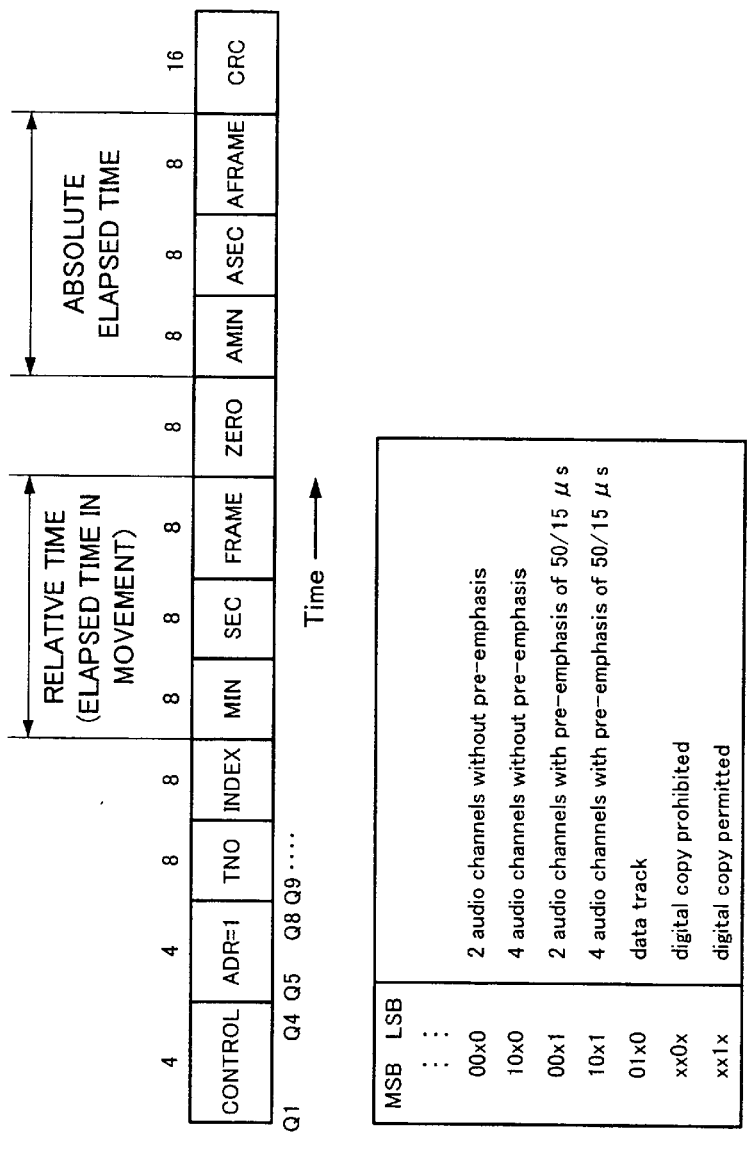
FIGS. 5A and 5B are schematic diagrams for explaining a Q channel of a sub-code.

FIG. 5A shows an example of the contents of Q1 to Q96. Four bits of Q1 to Q4 are set to a control area CONTROL. Four bits of Q5 to Q8 are set to an address area ADR. In a program area, an address is set to 0001. 72 bits of Q9 to Q80 are divided into areas every 8 bits. A track number area TNO, an index area INDEX, a relative time (elapsed time in a movement) area comprising minute MIN, second SEC, and frame FRAME, a zero-data area ZERO, and an absolute time area in the disc comprising minute AMIN, second ASEC, and frame AFRAME have sequentially been recorded in those areas. A CRC (Cyclic Redundancy Check) code is recorded in 16 bits of Q81 to Q96.

The number of channels of the audio data, emphasis, and information showing whether the disc is a disc on which the audio data has been recorded or a CD-ROM in which data of a computer or the like has been recorded or the like are recorded in the control area CONTROL. That is, as shown in FIG. 5B, when 4 bits in the area CONTROL are set to 00x0, it is shown that the data is 2-channel audio data without pre-emphasis; when they are set to 10x0, it is shown that the data is 4-channel audio data without pre-emphasis; when they are set to 00x1, it is shown that the data is 2-channel audio data with pre-emphasis of a time constant 50 μsec or 15 μsec; and when they are set to 10x1, it is shown that the data is 4-channel audio data with pre-emphasis of a time constant 50 μsec or 15 μsec. When 4 bits in the area CONTROL are set to 01x0, it is shown that the track is used as a data storage. When 4 bits in the area CONTROL are set to xx0x, it is shown that a digital copy is inhibited. When 4 bits in the area CONTROL are set to xx1x, it is shown that the digital copy is permitted.

FIG. 6 shows an example of a recording format in the CD-ROM defined on the CD format. In this case, the data of one sub-code frame, namely, 98 frames is handled as a sector serving as a minimum unit in the recording and reproduction of information. Since data of 24 bytes is held in one frame, 2352 bytes are stored in one sector. A fixed pattern 00 FF FF FF FF FF FF FF FF FF FF 00 h of 12 bytes has been recorded at the head of each block (sector) and is used as a sync pattern. Four bytes subsequent to the sync pattern denote a header. The header comprises the absolute time recorded also in the sub-code Q and a signal indicative of a mode. Three kinds of modes exist in dependence on the recording contents subsequent to the header. In mode 1, data of 2048 bytes, CRC data of 4 bytes, 0 data of 8 bytes, a P-parity of 172 bytes, and a Q-parity of 104 bytes are sequentially recorded.

In form 1 in mode 2, a sub-header of 8 bytes, data of 2048 bytes, CRC data of 4 bytes, a P-parity of 172 bytes, and a Q-parity of 104 bytes are sequentially recorded. In form 2 in mode 2, a sub-header of 8 bytes, data of 2324 bytes, and CRC data of 4 bytes are sequentially recorded.

According to the BCD expression by the MSE format as mentioned above, up to 99min59sec74frame (about 900 MB) can be expressed. However, in case of considering a case of a high density optical disc whose recording capacity has been improved two, three, or more times as compared with the ordinary CD, CD-R, CD-RW, or the like, there is a problem such that the absolute time (address) expression corresponding to the recording capacity cannot be performed. According to the invention, in order to cope with the realization of a large capacity, the absolute time expression is expanded by changing the recording contents of the Q channel of the sub-code. To increase the recording capacity, a track pitch is further narrowed and a linear density is more raised. Even if physical dimensions such as a diameter and the like are the same as those of the CD, the recording capacity can be almost doubled by those two methods.

In the Q channel of the sub-code mentioned above with reference to FIGS. 5A and 5B, the relative time area and the subsequent zero-data area ZERO do not have information which is important at the time when an actual reproducing process is executed. That is, the relative time is subtracted in a music piece (between the pause areas PAUSE) and starts from 0 (zero) at the start position of each music piece. This information, however, can be calculated from the other information. That is, the absolute time on the disc in which the position where the pause of the first music piece starts is set to "0" and which is subsequently increased has been recorded in the absolute time area (AMIN, ASEC, AFRAME). In addition to such information, since the PAUSE interval can be known from the index area INDEX of the sub-code Q in the P channel of the sub-code, the relative time can be easily calculated on the basis of those information.

Since the processing ability of a control microcomputer of a player was small at the beginning of the development of the CD, to obtain a construction such that it is sufficient to read the relative time recorded on the CD and display it as it is, it is effective to record the relative time into the sub-code. However, as a result that the processing ability of the control microcomputer was remarkably improved, it is hardly necessary to record the relative time into the sub-code of the CD or the like. "0" has merely been recorded in the zero-data area ZERO. Although there is a case where this area is used as a laser power calibration area regarding the CD-R or CD-RW, it is generally hardly used.

It is, therefore, considered to be effective that various additional information is recorded to 32 bits obtained by adding the zero-data area ZERO to 24 bits of the relative time area. According to the invention, the absolute time area which becomes insufficient due to the realization of the large capacity of the optical disc is expanded by using such areas.

FIG. 7 shows the first embodiment of the invention in which the area of the digit of "minute" of the absolute time is expanded by using the zero-data area ZERO. The digit of "100 minutes" is expressed by the BCD code by using lower four bits in the zero-data area ZERO of 8 bits. Thus, the absolute time of up to 999min59sec74frame can be expressed. As will be explained hereinlater, for example, identification (ID) information showing that the disc is the high density optical disc or the like can be also expressed by using upper 4 bits in the zero-data area ZERO.

The second embodiment of the invention in which the area of the digit of "minute" of the absolute time is expanded by using the relative time area will now be described with reference to FIG. 8. The digit of "100 minutes" is expressed by the BCD code by using lower four bits in the relative time area of 24 bits. Thus, the absolute time of up to 999min59sec74frame can be expressed. Other information can be also expressed by using upper 20 bits in the relative time area. An optical disc reproducing apparatus according to another embodiment of the invention is similar to that regarding the embodiment of the invention explained above with reference to FIG. 1.

FIG. 9 shows the third embodiment of the invention in which the digit of "hour" of the absolute time is formed by using the zero-data area ZERO. The digit of "hour" is formed by using 4 bits in the zero-data area. Thus, the time information of up to 9h59min59sec74frame can be expressed.

Figure 10:
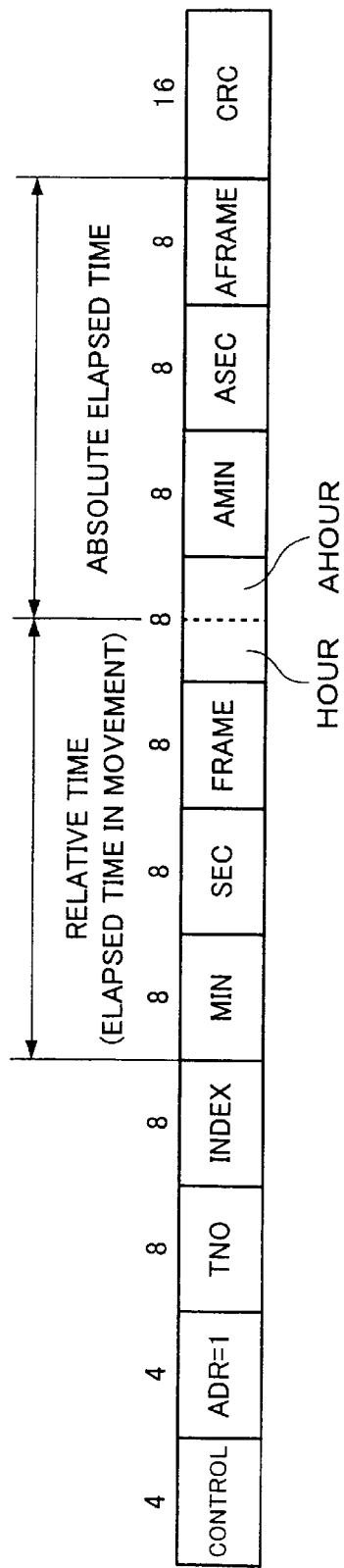
FIG. 10 is a schematic diagram for explaining a format of a sub-code in the third embodiment of the invention.

More specifically speaking, as shown in FIG. 10, 8 bits in the zero-data area ZERO are divided every 4 bits, the former half 4 bits are allocated to the digit (HOUR) of "hour" of the relative time, and the latter half 4 bits are allocated to the digit (AHOUR) of "hour" of the absolute time. As mentioned above, since the significance of the information of the relative time is low, in case of the high density disc, the time information is not actually recorded but those areas are set to FF FF FF Fh. The digit of "hour" of the absolute time is expressed by the BCD code of 0 to 9. In the high density disc, for example, the absolute time is set to 0h09min30sec50frame at the start position of a lead-in area and set to 0h12min00sec00frame at the start position of the program area. As mentioned above, by allocating lower 4 bits in the zero-data area ZERO to the absolute time "hour", the information from the digit of "hour" of the absolute time to the digit of "frame" can be handled as a series of data.

Subsequently, the fourth embodiment of the invention will now be described with reference to FIG. 11. In the third embodiment shown in FIG. 9, the digit of "hour" is carried by setting 60 minutes to a unit. In the fourth embodiment, the digit of "hour" is not used in the case where the time is shorter than 80 minutes and the digit of "hour" is used in the case where the time is equal to or longer than 80 minutes. In other words, the digit of "hour" is not used until 79min59sec74frame, the next absolute time is set to 1h20min00sec00frame, and after that, the digit of "hour" is used. However, a delimiter time can be also set in a width of about a few minutes before and after the time of 80 minutes. For example, the time from 81 minutes can be also set to 1h21min00sec00frame. Further, "80 minutes" can be also replaced with "90 minutes".

In the existing CD, CD-R, and CD-RW, almost of the maximum recording times are equal to "80 minutes". There is sometimes the case where the maximum recording time exceeds "90 minutes". The time information on the order of 90 minutes is used in the lead-in area. Therefore, the digit of "minute" is set to a time shorter than 90 minutes. An optical disc reproducing apparatus according to the other embodiment of the invention is similar to that according to the embodiment of the invention mentioned above with reference to FIG. 1.

Besides the foregoing first to fourth embodiments of the invention, for example, an absolute time expressing method adapted to various situations such that it is matched with the daily time recognition, circumstances of the edition, etc., and the like can be realized by the invention.

The ID information of the high density optical disc will now be described. Information different from that in the ordinary CD, CD-R, or CD-RW or a pattern which ought not to be recorded in the ordinary CD or the like is recorded as ID information into the high density optical disc. By detecting such ID information, the optical disc apparatus can promptly start the reproducing process of the high density optical disc. For example, a method whereby an arbitrary bit in the zero-data area ZERO in the Q channel of the sub-code is set to "1" and used as an identifier or the like is considered. In the foregoing first to fifth embodiments of the invention or the like, a method whereby the bit which is not used for expressing the absolute time, for example, bit 7 in the zero-data area ZERO is set to "1" and used as an identifier or the like is considered.

In the case where the high density disc has a multilayer structure, a layer number can be allocated to each layer and can be expanded to empty bits such as upper four bits or the like in the zero-data area ZERO. In this case, which layer is being reproduced can be easily identified by the drive on the basis of the data in this area. A movement distance and a moving direction at the time when the optical pickup is moved from the layer which is at present being reproduced to another layer can be also easily calculated.

In the case where the high density optical disc has a different recording density in the same recording layer, information useful for a disc access can be recorded by using the empty bits such as upper four bits or the like in the zero-data area ZERO. For example, in the case where the track pitch of the inner rim is equal to the same value, 1.6 µm, as that of the ordinary CD and the track pitch from the middle rim or outer rim is set to 1.1 µm, by recording the information regarding such a change in track pitch by using the empty bits, the pickup can be accurately moved. For example, by recording the additional information such as "01" in case of the lead-in area, "10" in case of the program area, and "11" in case of the lead-out area by using the empty bits, the position of the optical pickup can be promptly grasped at a certain precision.

By recording several additional information as mentioned above to, for example, the empty bits such as upper 4 bits or the like in the zero-data area ZERO, if the bit other than "0" is detected in the zero-data area ZERO, the drive can identify the fact that the disc is a disc having a recording format different from that of the ordinary CD or the like, or the like.

As another method, various additional information can be also recorded in an area where the information which is not relatively important has been recorded such as zero-data area ZERO, relative time information area, or the like. For example, some information can be also expressed by recording data which is not obviously the time information into the area where the time information has been recorded in the ordinary CD. For instance, "FFFFFh" can be used as such data.

In the high density optical disc, in case of enabling data to be stored in the relative time area by a binary expression instead of the MSF expression based on the BCD, each digit which is expressed by 4 bits is circulated to 0 to A, B, C, D, E, and F instead of the BCD expression corresponding to 0 to 9. In the reproducing apparatus, therefore, when the states of A to F are detected, it is possible to discriminate the fact that the loaded optical disc is not the optical disc such as an ordinary CD or the like but the high density optical disc. In this case, the apparatus can discriminate whether the loaded optical disc is the ordinary optical disc or the high density optical disc by monitoring the Q channels in at least 11 sub-code frames.

According to the embodiment of the invention mentioned above, the information different from the information in the frame format of the ordinary CD or the like is recorded in the zero-data area and/or relative time area in the Q channel of the sub-code, thereby more properly expressing the information or the like regarding the absolute time and the type of disc. On the other hand, the information different from the information in the frame format of the ordinary CD or the like is recorded in another area, for example, in the track number area TNO, index area INDEX (refer to FIG. 5A), or the like in the Q channel of the sub-code, thereby also enabling the absolute time or the like to be more properly expressed.

Although the above explanation has been made mainly with respect to the CD as an example, the invention can be applied to an optical disc in which the sub-code information similar to that of the CD such as CD-R, CD-RW, or the like has been recorded. Further, the invention can be also applied to a recording medium in which information useful to the user and additional information regarding the information have been recorded.

In a CD-ROM, besides the sub-code, address information has been recorded as a header in main data. Further, in a recordable optical disc such as CD-R, CD-RW, or the like, address information has previously been recorded. As a recording method, a method (ATIP: Absolute Time In Pregroove) of recording address information into wobbled grooves by a frequency modulation is used. Those address information has been recorded synchronously with the sub-code. In the existing recordable optical disc, the address information has been recorded as time information. In the case where the recordable optical disc is formed as a high density disc, it is necessary to devise the address information in order to enable addresses of more number of data to be expressed. Specifically speaking, it is possible to cope with the high density disc by expressing the address information by a binary notation.

One frame of ATIP is set to a length of 42 bits, head four bits are set to a sync pattern, next 24 bits are set to an address expressing portion, and last 14 bits are set to a CRC. In the high density disc, the address expressing portion of 24 bits is expressed by the binary notation. If the addresses are expressed by showing all of 24 bits by the binary notation, the number of addresses is equal to $2^{24}$=16777216. Therefore, assuming that a data amount of one frame is set to 2 kbytes, the addressing of the data of up to about 33 Gbytes can be performed, so that it is possible to cope with the high density. Information other than the address information can be also recorded by using a part (1, 2, 3, or 4 bits) of the 24 bits for identification.

Figure 12:
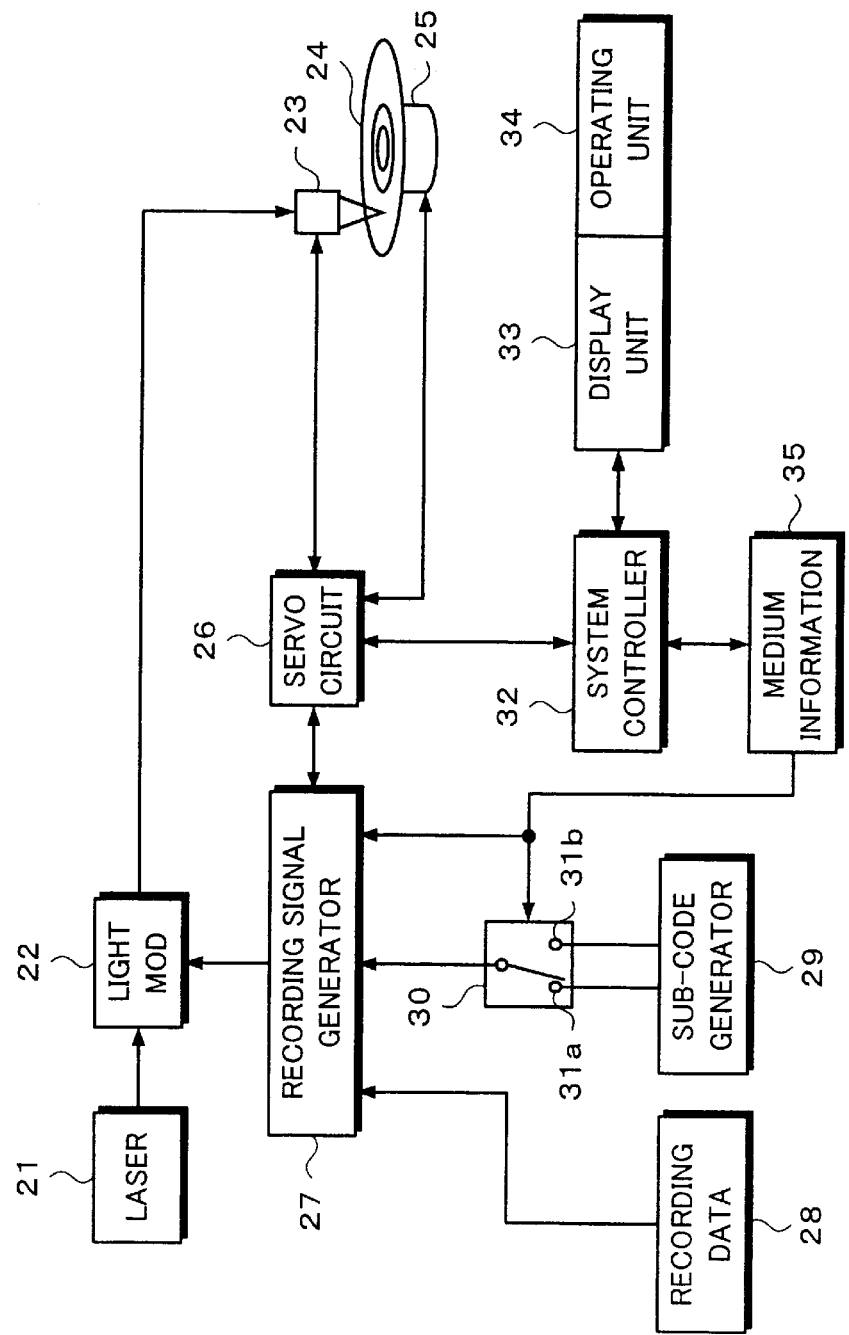
FIG. 12 is a block diagram showing the first example of a recording apparatus to which the invention is applied.

As mentioned above, since a plurality of formats exist as sub-codes or address information, it is preferable to record or reproduce the data in consideration of this point. FIG. 12 shows the first example of a recording apparatus in the case where the invention is applied to a mastering apparatus of an optical disc of the read-only type such as CD, CD-ROM, or the like.

The recording apparatus (mastering apparatus) shown in FIG. 12 comprises: a laser 21 serving as a gas laser such as Ar ion laser, He—Cd laser, Kr ion laser, or the like or a semiconductor laser; a light modulator 22 of an acousto-optical effective type for modulating a laser beam emitted from the laser 21; and an optical pickup 23 as recording means having an objective lens and the like for converging the laser beam passed through the light modulator 22 and irradiating it onto a photoresist surface of a disk-shaped glass mother disc 24 on which a photoresist serving as a photosensitive substance has been coated.

The light modulator 22 modulates the laser beam from the laser 21 in accordance with a recording signal. The mastering apparatus irradiates the modulated laser beam onto the glass mother disc 24, thereby forming a master disc on which the data has been recorded. A servo circuit 26 is also provided in order to control the optical pickup 23 so as to keep a distance between the optical pickup and the glass mother disc 24 constant, controlling the tracking operation, and controlling the rotating operation of a spindle motor 25. The glass mother disc 24 is rotated by the spindle motor 25.

The recording signal from a recording signal generator 27 is supplied to the light modulator 22. Recording data 28 and a sub-code selected by a switching circuit 30 are supplied to the recording signal generator 27. The switching circuit 30 has two input terminals 31a and 31b. Outputs of a sub-code generator 29 are supplied to those input terminals. The sub-code generator 29 generates different kinds of sub-codes and supplies them to the input terminals 31*a* and 31*b* of the switching circuit 30, respectively.

For example, the mastering apparatus is used in common by the mastering of the ordinary (existing) CD and the high density disc. In case of the mastering of the CD, the sub-code generator 29 supplies the sub-code of the MSF format to the recording signal generator 27 through the input terminal 31*a*. In case of the mastering of the high density disc, the sub-code generator 29 supplies the sub-code of, for example, the H (hour) MSF format to the recording signal generator 27 through the input terminal 31*b*. A system controller 32 controls the servo circuit 26 and controls the track pitch and the linear velocity. Between the ordinary CD and the high density disc, the track pitch and the linear velocity are switched by the system controller 32. Further, the controller 32 controls the whole operation of the mastering apparatus.

The recording signal generator 27 converts the recording data 28 and the sub-code passed through the switching circuit 30 into the data of the CD format or the high density disc format. That is, in case of any format, fundamentally, an error correction coding process and a scrambling process are performed and, further, the data is EFM (Eight to Fourteen Modulation) modulated. In case of the high density disc, the data is recorded by, for example, the CD-ROM format. In case of the CD, the recording data 28 is linear PCM audio data. In case of the high density disc, it is non-compression data or compression data.

Further, medium information showing the type of recording medium is recorded in a predetermined area such as lead-in area, lead-out area, or the like of the disc. Upon recording, the switching circuit 30 and recording signal generator 27 are controlled by medium information 35 which is generated from the system controller 32. A display unit 33 and an operating unit 34 are provided in association with the system controller 32.

The glass mother disc 24 recorded by the foregoing mastering apparatus is developed and a metallic master is formed by electroforming it. Subsequently, a mother disc is formed from the metallic master. Further, a stamper is formed from the mother disc. A CD or high density disc is formed by using the stamper by a method such as compression molding, injection molding, or the like. As mentioned above, the recording (mastering) apparatus shown in FIG. 12 can be used in common for the existing CD and the high density disc by switching the generation of the sub-code and the recording signal forming process.

Figure 13:
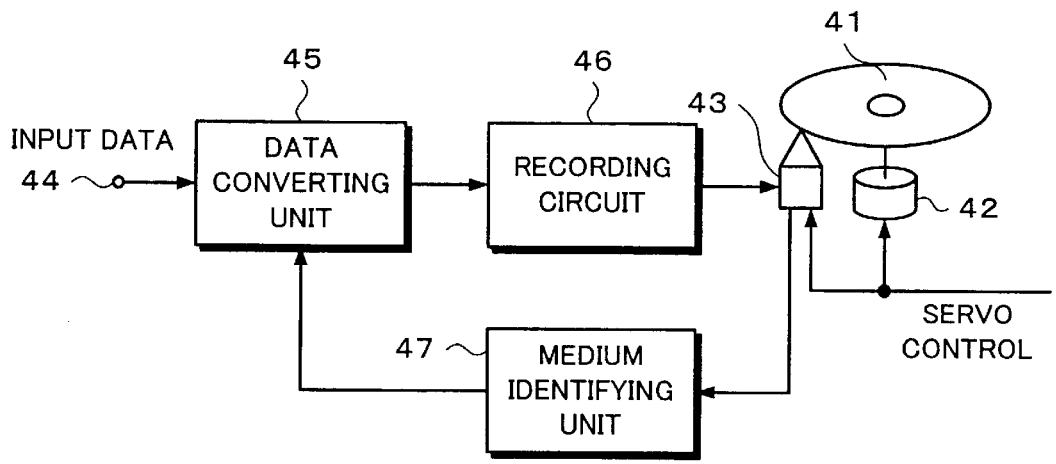
FIG. 13 is a block diagram showing the second example of the recording apparatus to which the invention is applied.

FIG. 13 shows the second example of the recording apparatus. An optical disc 41 is a recordable disc and the existing CD-R, CD-RW, or high density disc can be used. A spindle motor 42 for rotating the optical disc 41 and an optical pickup 43 are servo-controlled. Input data from an input terminal 44 is supplied to a data converting unit 45. A recording signal from the data converting unit 45 is supplied to a recording circuit 46. An output signal of the recording circuit 46 is supplied to the optical pickup 43 and recorded on the optical disc 41.

When the optical disc 41 is loaded, medium information is read out from a predetermined area. The read-out medium information is supplied to a medium identifying unit 47. The medium identifying unit 47 generates an identification (ID) signal showing whether the optical disc 41 is the (existing) disc of a standard recording density or the disc of the high density type. The ID signal is supplied to the data converting unit 45 and a signal process according to the type of optical disc is performed. Although not shown, the servo control is also performed on the basis of the medium information.

The input data from the input terminal 44 is reproduction data from the existing optical disc or the high density disc and also includes the sub-code. For example, the input data is supplied through an interface such as IEC958. Therefore, if the type of optical disc from which the input data was generated and that of the optical disc 41 to be recorded are the same, no signal process is performed in the data converting unit 45. If the type of optical disc from which the input data was generated and that of the optical disc 41 are different, a sub-code converting process is performed. If necessary, a converting process of the recording data is performed. For example, in the case where the input data is the reproduction data from the CD and the optical disc 41 is the high density disc, the data converting unit 45 converts the sub-code of "74min05sec15frame" in the input data into "1h14min05sec15frame".

Figure 14:
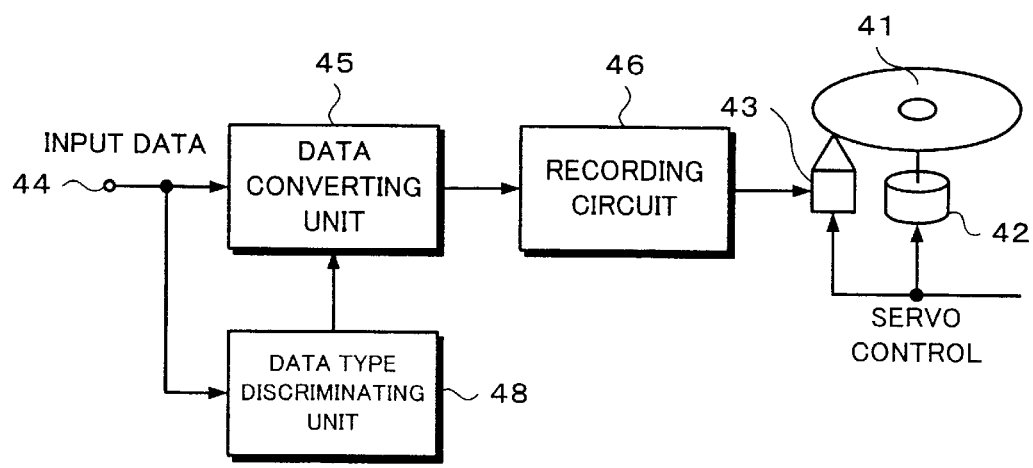
FIG. 14 is a block diagram showing the third example of the recording apparatus to which the invention is applied.

FIG. 14 shows the third example of the recording apparatus. The optical disc 41 is a recordable disc and the existing optical disc or the high density disc can be used. That is, in FIG. 14, the type of optical disc 41 is fixed. The spindle motor 42 for rotating the optical disc 41 and the optical pickup 43 are servo-controlled. The input data from the input terminal 44 is supplied to the data converting unit 45. The recording signal from the data converting unit 45 is supplied to the recording circuit 46. The output signal of the recording circuit 46 is supplied to the optical pickup 43 and recorded on the optical disc 41.

The input data from the input terminal 44 is reproduction data from the existing optical disc or the high density disc and also includes data type information and the sub-code. Therefore, a data type discriminating unit 48 can discriminate whether the optical disc from which the input data was generated is the existing optical disc or the high density disc. A discrimination result is supplied to the data converting unit 45. If the type of optical disc 41 which is used as a recording medium and that of the disc from which the input data was generated are the same, the data converting unit 45 does not execute the converting process of the sub-code. If the type of optical disc from which the input data was generated and that of the optical disc 41 are different, a sub-code converting process is performed. If necessary, the converting process of the recording data is performed.

Figure 15:
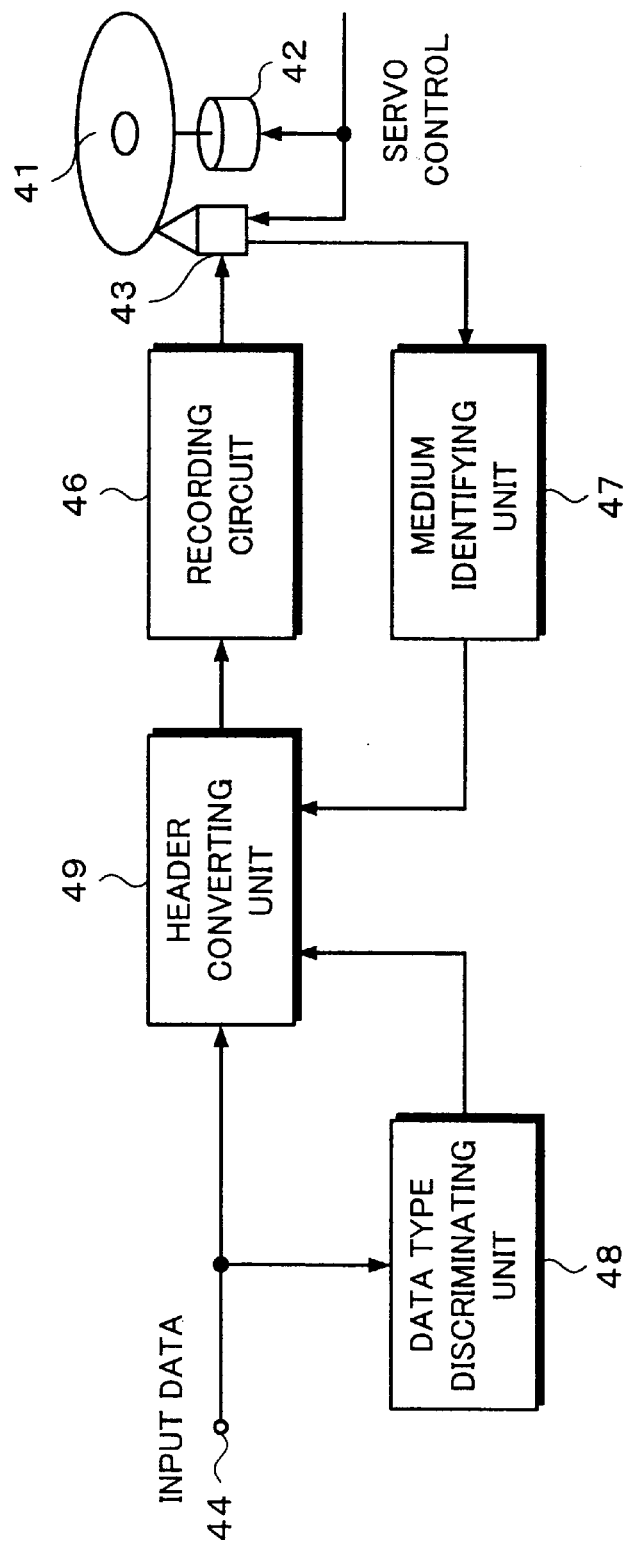
FIG. 15 is a block diagram showing the fourth example of the recording apparatus to which the invention is applied.

FIG. 15 shows the fourth example of the recording apparatus. The optical disc 41 is a recordable disc and the existing optical disc such as a CD-R or the like or the high density disc can be used. Which type of disc has been used is discriminated by the medium identifying unit 47 on the basis of the medium information. The input data is the reproduction data from the existing CD-ROM or the reproduction data of the high density disc. The address information expressed by the MSF format is included as a header in the reproduction data of the existing CD-ROM. The address information expressed by the binary format is included as a header in the reproduction data from the high density disc. The type of input data is discriminated by the data type discriminating unit 48.

The ID information from the medium identifying unit 47 and the discrimination data from the data type discriminating unit 48 are supplied to a header converting unit 49. The header converting unit 49 determines whether the type of input data and that of the optical disc 41 coincide or not from both information and converts the data format of the header in accordance with the type of optical disc 41. When they coincide, a converting process of the header is not performed. For example, in the case where the input data is the data from the existing CD-ROM and the optical disc 41 is the high density disc, the address of the MSF format is converted into the address expressed by the binary notation.

According to the foregoing recording apparatus, the data authored by the optical disc such as existing CD, CD-ROM, or the like can be transferred or recorded to the high density disc only by a converting process of the time information. On the contrary, the data authored by the high density disc can be transferred or recorded to the existing disc only by the converting process of the time information. Further, it is also possible to cope with a difference of the format of the address information of the CD-ROM without limiting to the sub-code.

Figure 16:
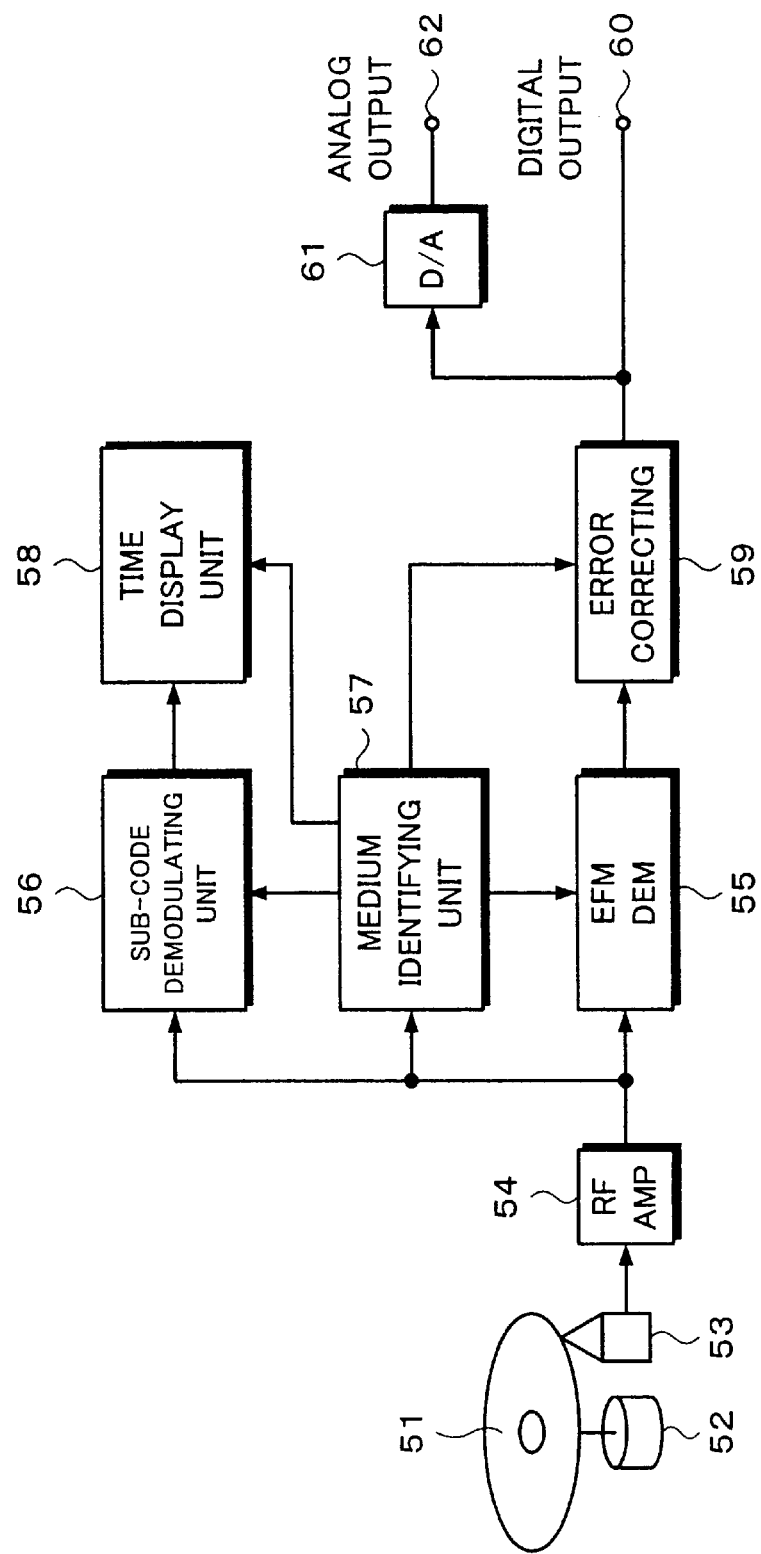
FIG. 16 is a block diagram showing an example of a reproducing apparatus to which the invention is applied.

FIG. 16 shows a construction of a reproducing apparatus according to the invention. An optical disc 51 is the existing disc or the high density disc. The optical disc 51 is rotated by a spindle motor 52 and a recording signal on the optical disc 51 is read by an optical pickup 53. The read signal is supplied to an RF amplifier 54. An output signal of the RF amplifier 54 is supplied to an error correcting circuit 59 through an EFM demodulator 55. An error correction is performed by the error correcting circuit 59. A digital output from the error correcting circuit 59 is taken out to an output terminal 60. The digital output is transmitted through a D/A converter 61, so that an analog output is taken out to an output terminal 62.

A sub-code demodulating unit 56 and a medium identifying unit 57 are connected to the RF amplifier 54. A time display unit 58 is connected to the sub-code demodulating unit 56. The time display unit 58 displays time on the basis of the demodulated sub-code. The medium identifying unit 57 identifies whether the optical disc 51 is the existing disc or the high density disc. An identification result of the medium identifying unit 57 is supplied to the EFM demodulator 55, sub-code demodulating unit 56, time display unit 58, and error correcting circuit 59. Thus, a signal process corresponding to the type of optical disc 51 is performed.

In the time display unit 58, it is prevented that the time display is changed depending on the difference of the type of optical disc to be reproduced, thereby performing the uniformed time display. For example, when the value of "minute" exceeds 60 minutes, a display of one hour is performed in accordance with the sub-code of the high density disc. Thus, the time display can be made common irrespective of the type of optical disc 51. As another method of the time display, there is a method whereby the time display is matched with that of the CD even if the optical disc 51 to be reproduced is the high density disc. That is, the time shorter than 80 minutes (or 90 minutes) is displayed by minute and the time that is equal to or longer than 80 minutes (or 90 minutes) is displayed by hour. According to the other method, since the time display can be matched with that of the existing CD, it is possible to prevent a situation that the user feels a sense of difference.

Figure 17:
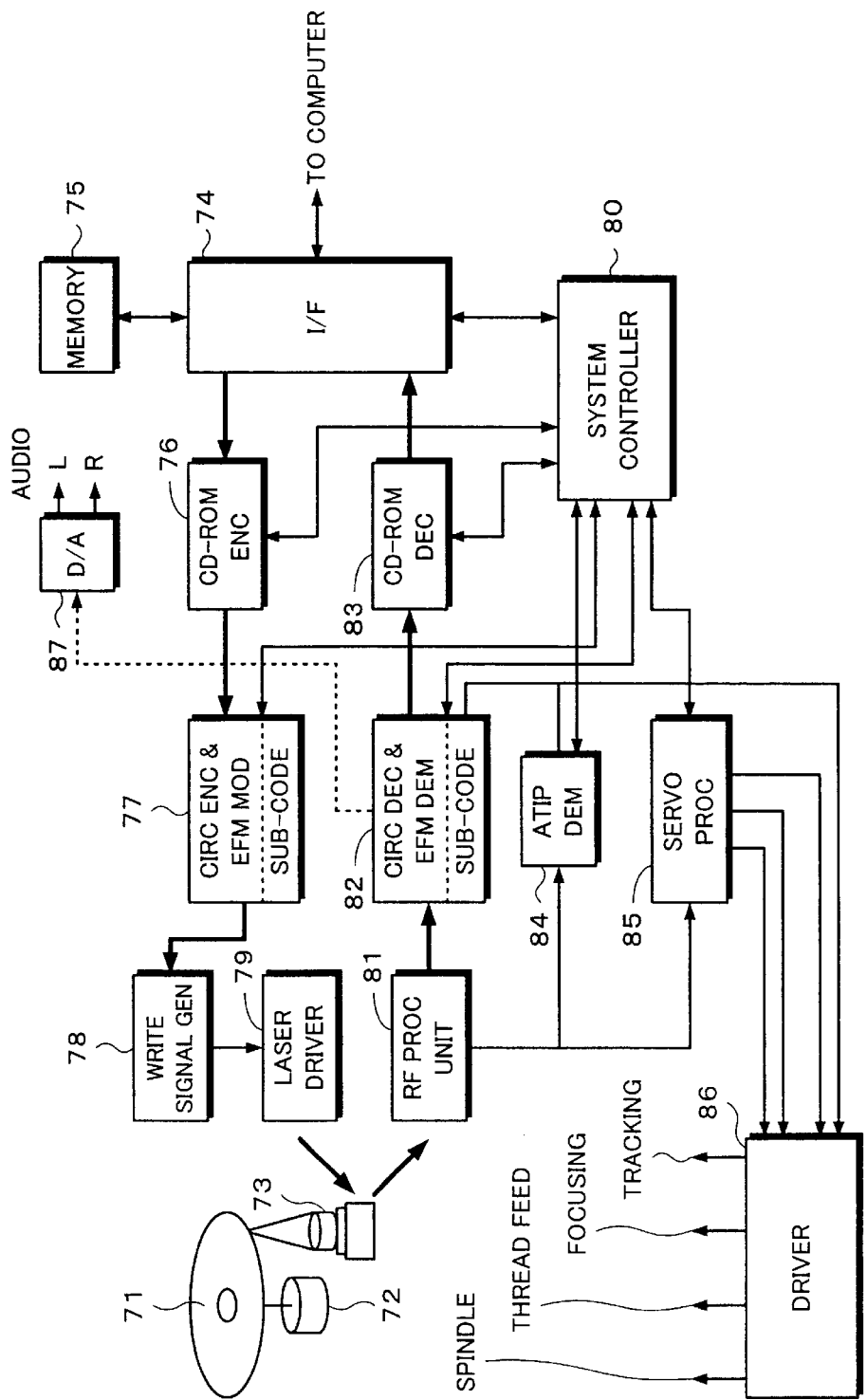
FIG. 17 is a block diagram showing a construction of an example of a disc recording and reproducing apparatus to which the invention can be applied.

FIG. 17 shows an example of a construction of a drive of a recordable (WORM type or rewritable) optical disc. Reference numeral 71 denotes a disc, for example, a high density disc. The existing recordable optical disc (CD-R, CD-RW) can be also used. The disc 71 is rotated by a spindle motor 72. An optical pickup 73 is provided in order to record data to the disc 71 and reproduce the data therefrom. The optical pickup 73 is moved in the disc radial direction by a feed motor (not shown).

For example, the disc 71 is a phase change type disc which can be recorded by a laser beam and can be reproduced by detecting a reflection light amount difference. Polycarbonate is used as a material of a board on which a recording film is coated. Track guide grooves called grooves have previously been formed on the board by injection molding. Since the grooves are preliminarily formed, they are also called pre-grooves. An interval between the grooves is called a land. The grooves are spirally continuously formed from the inner rim toward the outer rim. The invention can be also applied to a magnetooptic disc and a WORM-type disc using an organic pigment as a recording material so long as it can be recorded.

The grooves are formed in a zigzag manner (called "wobble") for the purposes of controlling the rotation of the disc and using it as a reference signal upon recording. Data is recorded in the grooves or on the grooves and lands. Further, address information is continuously recorded as wobble information of the grooves. The optical pickup is moved to a desired writing position with reference to the address which is obtained by the wobble information, thereby writing the data onto the disc.

The data to be recorded is supplied to the drive through an interface 74. The SCSI (Small Computer System Interface), ATAPI (AT Attachment Packet Interface), or the like can be used as an interface 74. A memory 75 is connected to the interface 74. The recording data transmitted through the interface 74 is supplied to a CD-ROM encoder 76 and the data of the CD-ROM format is formed. An output of the CD-ROM encoder 76 is supplied to a CIRC (Cross Interleave Reed Solomon Code) encoding and EFM modulating unit 77. In this block 77, a sub-code similar to that of ATIP is formed.

An output of the CIRC encoding & EFM modulating unit 77 is supplied to a write signal generating unit 78 and a write signal is generated. The write signal is supplied to a laser driver 79. An output of the laser driver 79 is supplied to the optical pickup 73. In this manner, the data is recorded on the disc 71.

The optical pickup 73 reproduces the data on the disc 71. The signal detected by the photodetector is supplied to an RF signal processing unit 81. In the RF signal processing unit 81, a matrix amplifier arithmetically operates the detection signal of the photodetector, thereby forming a reproduction (RF) signal, a wobbling signal, a tracking error signal TE, a focusing error signal FE. The RF signal is supplied to a CIRC decoding and EFM demodulating unit 82. The wobbling signal which is obtained as a push-pull signal is supplied to an ATIP demodulator 84. The tracking error signal and the focusing error signal are supplied to a servo processor 85. Further, a driver 86 for driving each unit in response to an output of the servo processor 85 is provided. The servo processor 85 executes a tracking servo and a focusing servo for the optical pickup 73, a spindle servo for the spindle motor 72, and a thread servo for the feed motor.

An EFM demodulation, a decoding (namely, error correction) process of an error correction code, or the like is performed in the CIRC decoding & EFM demodulating unit 82. An output of the block 82 is supplied to a CD-ROM decoder 83. Output data of the CD-ROM decoder 83 is outputted through the interface 74.

An ATIP demodulator 84 supplies the wobbling signal to an FM demodulator through a band pass filter for allowing only the signal at frequencies near a carrier frequency (22.05 kHz) to pass, thereby obtaining a biphase signal. Further, a clock taken out of the biphase signal is used for controlling the spindle motor 72 and address data in the biphase signal is extracted by the clock. The address from the ATIP demodulator 84 is supplied to a system controller 80 and the system controller 80 controls the seeking operation by using the address. The system controller 80 controls the interface 74, CD-ROM encoder 76/decoder 83, CIRC encoding & EFM modulating unit 77, CIRC decoding & EFM demodulating unit 82, RF signal processing unit 81, servo processor 85, and the like.

In order to continuously pre-format the address information (binary expression in the high density disc; MSF format in the existing disc), the groove serving as a guide groove of the laser beam is wobbled and the address information is continuously recorded as wobble information on the disc 71. The data is written to the disc with reference to the address information obtained by the wobble information. Actually the signal which was frequency modulated by the carrier at 22.05 kHz has been inserted in the wobble data and the address information is obtained by demodulating this signal. The address information is called ATIP and indicates an absolute address on the disc.

The recording apparatuses shown in FIGS. 13, 14, and 15 and the reproducing apparatus shown in FIG. 16 can be realized by the disc recording/reproducing apparatus shown in FIG. 17 mentioned above.

For example, a case where the recording apparatuses shown in FIGS. 13 and 15 are applied to the disc recording/reproducing apparatus shown in FIG. 17 will now be explained hereinbelow.

When the disc 71 is loaded to the drive, data in a predetermined area, for example, a lead-in area on the disc 71 is reproduced by the optical pickup 73 serving as an optical pickup 43 shown in FIG. 13. As for the reproduced signal, the RF signal is supplied to the CIRC decoding & EFM demodulating unit 82 via the RF signal processing unit 81 and the push-pull signal is supplied to the ATIP demodulator 84. At this time, if the disc 71 is a high density disc, a part of the sub-code (Q channel) which is demodulated by a sub-code demodulator included in the CIRC decoding & EFM demodulating unit 82 is different from the sub-code in the existing CD frame shown in FIG. 5 as shown in, for example, FIG. 10, so that it can be used as an ID signal indicative of the type of optical disc.

That is, the CIRC decoding & EFM demodulating unit 82 outputs the ID signal and supplies it to the system controller 80, so that the system controller 80 operates as a medium identifying unit 47 shown in FIG. 13. On the basis of the supplied ID information, the system controller 80 discriminates whether the loaded disc 71 is the existing optical disc corresponding to the CD format or the high density disc corresponding to the new format defined on the basis of the CD format, and switches the operations of the CIRC encoding & EFM modulating unit 77 and the CIRC decoding & EFM demodulating unit 82 serving as a data converting unit 45 shown in FIG. 13 in a manner such that the subsequent decoding/encoding processes of the sub-code and the encoding/decoding processes of the error correction code correspond to each type of optical disc.

The detection of the type of optical disc based on the ID signal can be also realized by a method whereby the system controller 80 identifies the address information which is outputted from the ATIP demodulator 84. That is, in case of the existing optical disc, as address information included in the ATIP, each of the minute (MIN), second (SEC), and frame number (FRAME) is expressed by the BCD code. On the other hand, in case of the high density disc, the address information is expressed by a binary notation of 24 bits. Therefore, the system controller 80 discriminates a difference of the address information from the ATIP demodulator 84, thereby enabling the type of disc to be recognized.

Further, when the type of disc 71 is identified by the system controller 80, the system controller 80 operates the CD-ROM encoder 76 and adds the header (refer to FIG. 6) corresponding to each disc when the recording data inputted via the interface 74 is converted into the data of the CD-ROM format. That is, the system controller 80 supplies the identification result Of the disc to the CD-ROM encoder 76 serving as a header converting unit 49 shown in FIG. 15, thereby controlling so as to switch the data format of the address information included in the header in the CD-ROM encoder 76. Obviously, the system controller 80 also switches the decoding process of the CD-ROM format including the header by operating the CD-ROM decoder 83 in accordance with the type of disc.

The present invention is not limited to the foregoing embodiments but many modifications and variations are possible within the spirit and scope of the appended claims of the invention.

According to the invention, by recording the information different from the information in the frame format of the ordinary CD or the like into the zero-data area or relative time area in the Q channel of the sub-code, the information regarding the absolute time, the type of disc, and the like can be more properly expressed. Thus, in the optical disc of a large capacity and a high density or the like, the proper absolute time can be expressed even in the case where the absolute time exceeds 99min59sec74frame.

According to the invention, the digit of hour is not used when the recording time is shorter than the predetermined time (80 minutes or 90 minutes) and the digit of hour is used when the recording time is equal to or longer than the predetermined time. Therefore, the high density can be realized while maintaining the matching performance with the time expression in the medium such as an existing CD or the like.

Further, according to the invention, the data can be mutually transferred between the existing medium and the high density medium by the conversion of the time information and the authored data can be easily transferred and recorded.

According to the invention, the information regarding the discrimination of the type of disc such as a discrimination about whether the disc is the high density optical disc or the ordinary optical disc is recorded in the disc, thereby enabling the reproducing apparatus to easily discriminate the type of disc. It contributes to the reduction of the burden on the apparatus and the reduction of the processing time.

Whether the disc has a multilayer structure or a single layer structure is checked. If it has the multilayer structure, the information showing in which recording layer the frame that is at present being accessed is located or the like, the information regarding the track pitch, or the like is recorded in the disc, thereby making it possible to contribute to realization of the high disc accessing efficiency upon reproduction.

The present invention is not limited to the foregoing embodiment but many modifications and variations are possible within the spirit and scope of the appended claims of the invention.

What is claimed is:

1. A disk shaped recording medium in which information is recorded by a recording format based on
   a compact disk format, wherein
   said recording medium has a sub code area in which a sub code as additional information is to be recorded, said sub code area has a Q channel for recording address information which shows a recording position of the information which is to be recorded on the disc shaped recording medium and includes absolute time information shown by each unit of "hour", "minute", "second", and "frame", and said Q channel is defined based on said compact disk format and a zero data area in said Q channel has an AHOUR area in which time information shown by the "hour" unit in said absolute time information is to be recorded.

2. The recording medium according to claim 1, wherein said AHOUR area is allocated to lower 4 bits in 8 bit data forming said zero data area in said Q channel.

3. The recording medium according to claim 1, wherein in said absolute time information, each unit of said "hour", "minute", "second", and "frame" is represented in a binary coded decimal code.

4. The recording medium according to claim 1, wherein said absolute time information of said "hour" unit is data in which 100 minutes is set to one "hour" unit.

5. The recording medium according to claim 1, wherein said absolute time information of said "hour" unit is data in which 60 minutes is set to one "hour" unit.

6. The recording medium according to claim 5, wherein said absolute time information of said "minute" unit is data in a range from 0 to 59.

7. The recording medium according to claim 1, wherein said Q channel has a specific area in which identification data, having a pattern in which at least a part of said pattern cannot appear by an encoding in said compact disk format, is to be recorded.

8. The recording medium according to claim 7, wherein said specific area is a part of said zero data area.

9. The recording medium according to claim 7, wherein said specific area is a relative time area in which relative time information showing a reproduction elapsed time of each music piece which is reproduced in said compact disk format is to be recorded.

10. The recording medium according to claim 7, wherein said identification data includes recording layer information showing whether a recording layer formed in said disk shaped recording medium has one of a single layer structure and a plural layer structure.

11. The recording medium according to claim 10, wherein when said disk shaped recording medium has the plural layer structure, said recording layer information indicates in which recording layer said specific area is included.

12. The recording medium according to claim 7, wherein said identification data includes information showing a type of said disk shaped recording medium.

13. The recording medium according to claim 12, wherein said identification data includes identification information showing that said disk shaped recording medium is an optical disc having a recording density higher than a recording density of a compact disk.

* * * * *